United States Patent

Mitchell-Dignan et al.

(10) Patent No.: US 7,710,643 B2
(45) Date of Patent: May 4, 2010

(54) APPARATUS FOR AND METHOD OF DELIVERING VISUAL IMAGE INTO AIR

(75) Inventors: Michael Mitchell-Dignan, Groton, CT (US); John A. Santini, Wakefield, RI (US); Barry E. Mapen, Stonington, CT (US)

(73) Assignee: Alion Science and Technology Corporation, McLean, VA (US)

(*) Notice: Subject to any disclaimer, the term of this patent is extended or adjusted under 35 U.S.C. 154(b) by 129 days.

(21) Appl. No.: 11/902,936

(22) Filed: Sep. 26, 2007

(65) Prior Publication Data

US 2008/0180798 A1 Jul. 31, 2008

Related U.S. Application Data

(60) Provisional application No. 60/898,398, filed on Jan. 31, 2007.

(51) Int. Cl.
*G03B 21/56* (2006.01)
(52) U.S. Cl. .................. 359/443; 353/28; 353/62
(58) Field of Classification Search ............ 359/443, 359/446, 900; 353/13, 28, 62
See application file for complete search history.

(56) References Cited

U.S. PATENT DOCUMENTS

| 620,592 | A | 3/1899 | Just |
| 1,935,084 | A | 11/1933 | Edwards |
| 2,827,831 | A | 3/1958 | Elion |
| 3,334,816 | A | 8/1967 | Mizuno |
| 3,786,498 | A | 1/1974 | Lipe |
| 3,949,212 | A | 4/1976 | Larrimore |
| 4,007,690 | A | 2/1977 | Wildridge |
| 4,904,982 | A | 2/1990 | Lieb |
| 4,974,779 | A | 12/1990 | Araki |
| 5,012,757 | A | 5/1991 | Williams |
| 5,019,822 | A | 5/1991 | Kirkland |
| 5,067,653 | A | 11/1991 | Araki |
| 5,261,344 | A | 11/1993 | Pickett |
| 5,315,285 | A | 5/1994 | Nykerk |
| 5,450,058 | A | 9/1995 | Collier |

(Continued)

FOREIGN PATENT DOCUMENTS

DE 42 22 951 2/1994

(Continued)

OTHER PUBLICATIONS

CLAWS: Contact Localization and Adaptive Warning System for: Unambiuous Warning Capability for Air, Land or Waterborne Personnel or Craft Approaching High value Maritime Assets; Dignan, ichael, et al. Aug. 2006.*

*Primary Examiner*—Christopher Mahoney
(74) *Attorney, Agent, or Firm*—Staas & Halsey LLP

(57) ABSTRACT

An image projection system that communicates an image into the air includes screen material particles, a screen generation device, a delivery device and a light projecting system. The screen generation device disperses the screen material particles from the screen generation device at a targeted screen location, thereby forming a projection screen. The delivery device launches the screen generation device from a launch location to the targeted screen location in the air. The light projecting device projects light from a projection location onto the screen to form the image on the screen so as to be visible from an observation location of a viewer.

20 Claims, 9 Drawing Sheets

U.S. PATENT DOCUMENTS

| | | |
|---|---|---|
| 5,580,140 A | 12/1996 | Katz |
| 5,871,267 A | 2/1999 | Wende |
| 6,388,949 B1 | 5/2002 | Lenhardt |
| 6,402,045 B1 | 6/2002 | Persson |
| 6,473,005 B2 | 10/2002 | Showell |
| 6,731,429 B2 | 5/2004 | Lunde |
| 6,733,134 B2 | 5/2004 | Bleiner |
| 6,765,487 B1 | 7/2004 | Holmes |
| 6,819,487 B2 * | 11/2004 | Palovuori et al. ............ 359/443 |
| 6,857,746 B2 | 2/2005 | Dyner |
| 6,985,212 B2 | 1/2006 | Jamieson |
| 6,997,558 B2 * | 2/2006 | Perlin et al. .................... 353/7 |
| 7,082,706 B1 | 8/2006 | Stinis |
| 2002/0171039 A1 | 11/2002 | Bennett |
| 2002/0186149 A1 | 12/2002 | Knaak |
| 2003/0137412 A1 | 7/2003 | Pan |
| 2006/0098272 A1 | 5/2006 | Lerner |
| 2006/0208867 A1 | 9/2006 | McLoughlin |
| 2007/0068053 A1 | 3/2007 | Troitski |

FOREIGN PATENT DOCUMENTS

| | | |
|---|---|---|
| GB | 450331 | 7/1936 |
| WO | 00/58238 | 10/2000 |
| WO | 2004/075132 | 9/2004 |

* cited by examiner

APPARATUS FOR AND METHOD OF DELIVERING VISUAL IMAGE INTO AIR

CROSS-REFERENCE TO RELATED APPLICATIONS

This non-provisional application claims the benefit of co-pending provisional application bearing application No. 60/898,398, filed Jan. 31, 2007, and entitled "CLAWS: CONTACT LOCALIZATION AND ADAPTIVE WARNING SYSTEM." The entire contents of the provisional application are incorporated by reference herein.

STATEMENT REGARDING FEDERALLY-SPONSORED RESEARCH

The government has certain rights in this invention by virtue of Contract Number HSCG32-06-C-R00017 awarded by the U.S. Coast Guard.

BACKGROUND

Several methods for producing images in the air are known. In skywriting, typically one or more airplanes disperse smoke from behind the airplane as it maneuvers. This trail of smoke forms the image as viewed by an observer. Atmospheric conditions will cause the smoke to disperse, limiting the complexity (e.g., size, shape, color) of images that may be formed using this technique. In addition, images formed from skywriting are not visible in the dark. The efficiency of a system is defined as the total time and cost necessary to display an image at a targeted location. Skywriting is relatively inefficient since it requires an airplane to take off, fly to an intended message position, and then create the image.

Cloud painting offers an alternative to skywriting. In cloud painting, typically a high-powered light is used to project an image onto an existing cloud where light reflects off the cloud toward the observer. Since the light source and observer are both on the same side of the imaging surface, we refer to this herein as front-projection. This technique is more efficient than skywriting and increases the complexity of the image that can be displayed. However, cloud painting can only project an image onto an existing cloud and therefore is not functional when the sky is clear. The ability to project an image at any location is defined as the flexibility of the system. An airplane can be used to produce a smoke cloud at an ideal location, thereby increasing flexibility, but at the expense of efficiency.

In addition, the brightness of the image is reduced as the light beam travels through the atmosphere due to scattering effects. Brightness is inversely proportional to the distance the beam traverses from the source to the observer. Therefore, the higher the altitude of the cloud, the dimmer the image will appear. Also, the higher the altitude of the cloud, the larger the projected image needs to be to appear as the same size when projected on a lower altitude cloud. To form a larger image, the light source must be spread over a larger area, resulting in a further reduction of brightness. Available light sources are not bright enough to compete with direct sunlight, and therefore cloud painting is typically not possible during daylight conditions.

An alternative to cloud painting is image projection onto a water screen. In general, a water screen is produced by spraying a controlled stream of water droplets or water vapor into the air to form a thin screen. To maintain the screen, a continuous supply of water is necessary, along with an apparatus to control the size and position of the water droplets. Water screens suffer from similar flexibility and efficiency constraints as cloud painting.

SUMMARY

The proposed system efficiently and flexibly produces a directed image in air. For example, in trying to warn an incoming boat that the boat is on a collision course with another watercraft, the warning must be delivered efficiently (prior to the collision) to a flexible location (near the incoming craft) so the message is clearly directed at the incoming boat even though others in the area may see the projected image.

Additional aspects and advantages will be, in part, set forth in the description which follows and, in part, will be obvious from the description, or may be learned by practice.

The inventors propose an image projection system to communicate an image into the air, including a screen generation device, a delivery device, and a light projecting device. The delivery device launches the screen generation device from a launch location to a targeted screen location in the air. The screen generation device disperses screen material particles in the air to form a projection screen. The screen generation device is comprised of screen material particles and a mechanism to disperse the particles. The light projecting device directs light from a projection location onto the projection screen to form the image so as to be visible from an observation location of a viewer.

The delivery device may be any mechanism capable of transmitting the screen generation device to the desired screen location. The delivery device may be a pneumatic launcher or a pyrotechnic lifting charge, for example.

The screen material particles may be formed of a material such that an image can be projected onto or through them. The screen material particles (particles) are of such size, shape, and density that the particles stay suspended in the air when the particles are dispersed from the screen generation device long enough to communicate an image onto the screen. The particles may be salt particles or glass micro-spheres, for example. The particles may fluoresce when illuminated by non-visible wavelengths of light.

The screen generation device may include a single pyrotechnic charge to disperse the screen material particles or may include a primary charge to disperse a plurality of independent screen generation units, which in turn independently disperse the particles. Alternatively, the screen generation device may include a non-explosive mechanism to disperse the screen material particles using rotational forces and/or airflow for example.

The screen generation device may include the plurality of screen generation units. As the size of the screen that can be generated using a single pyrotechnic charge may be limited in practice by the momentum that can be imparted on the individual screen material particles, a plurality of screen generation units is used in an embodiment to overcome the limitation. Since each of the screen generation units has greater mass than the individual screen particles, more momentum can be imparted on the screen generation units, resulting in separation distances greater than the size of a screen produced by a single charge. Each of the screen generation units is then able to generate a portion of the total screen, resulting in a larger screen possible than can be achieved with a single charge.

The light projecting device may project light onto a rear side or a front side of the screen with respect to the observation location of the viewer. The light projecting device may use incoherent or coherent light sources. The light projecting device may emit wavelengths other than visible light (e.g., UV). For example, ultraviolet light is attenuated less than visible light when transmitted through fog, and thus may be used to reach a screen comprised of material that fluoresces in the visible portion of the spectrum near the intended observer, which extends the range of utility of the embodiment in dense fog conditions.

The light projecting device may form the image by shining light through a sheet or plate that contains the image thereon. The light projecting device may form the image by scanning a light beam to draw the image.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

So that those of ordinary skill in the art to which the subject invention pertains will more readily understand how to make and use the systems described herein, embodiments of the invention will be described in detail with reference to the drawings, wherein.

DETAILED DESCRIPTION OF THE EMBODIMENTS

Reference is now made to the accompanying figures for the purpose of describing, in detail, embodiments of the present invention. The figures and accompanying detailed description are provided as examples of the invention and are not intended to limit the scope of the claims appended hereto.

Figure 1:
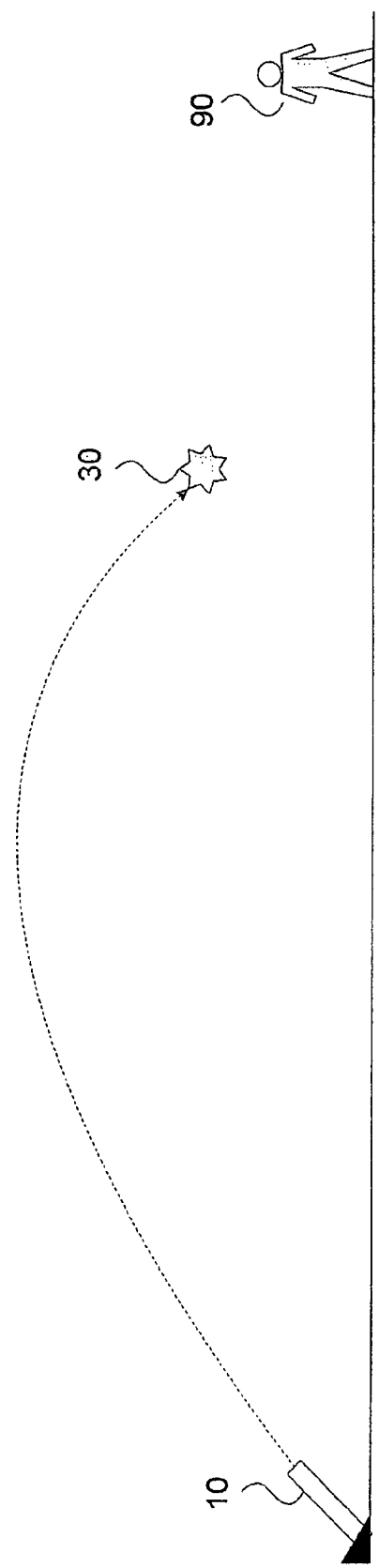
FIG. 1 illustrates a side view of a delivery device transmitting a screen generation device to a targeted location according to an embodiment of the image projection system.
Figure 2:
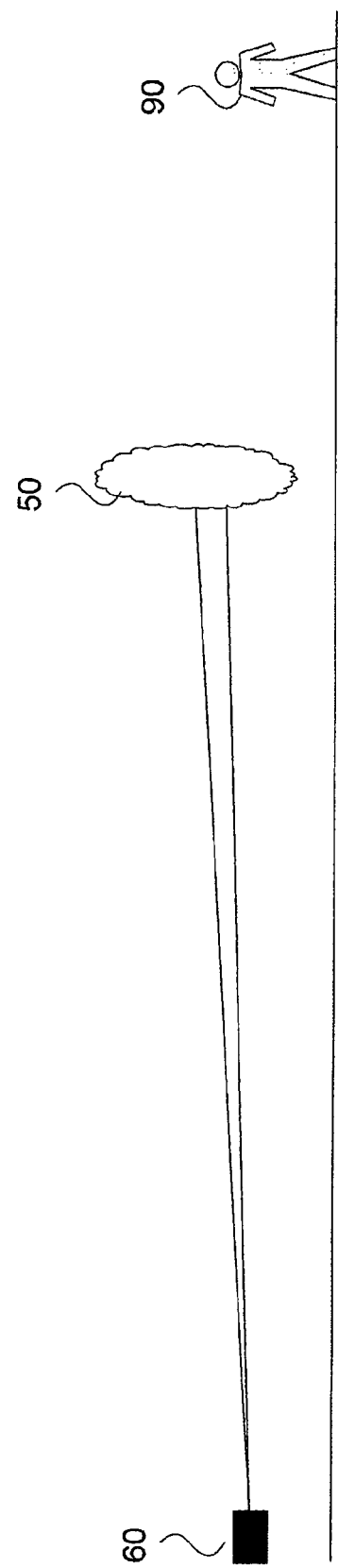
FIG. 2 illustrates a side view of a dispersed projection screen and a light projecting device of the image projection system according to the embodiment.

Referring to FIGS. 1 and 2, as seen from a side view, a delivery device 10, illustrated in FIG. 1 as a launcher, is used to transmit a screen generation device 30 illustrated in FIG. 1 as a pyrotechnic shell, to a targeted screen location. When the shell 30 reaches a programmed point in the parabolic flight path, the shell 30 is caused to disperse screen material illustrated in FIG. 2 as the projection screen 50. A light projector 60 illustrated in FIG. 2 aims light onto the screen 50 (seen more clearly in FIG. 3).

The shell 30 is loaded into the launcher 10, a firing solution is computed based on the relative motion of a launcher 10 and the observer 90, the launcher's 10 azimuth and elevation are adjusted to aim the shell 30, and an electronic match may be programmed with a time delay from launch to create a screen at an intended point in the parabolic flight path of the screen generation device, i.e., the shell 30.

Figure 4:
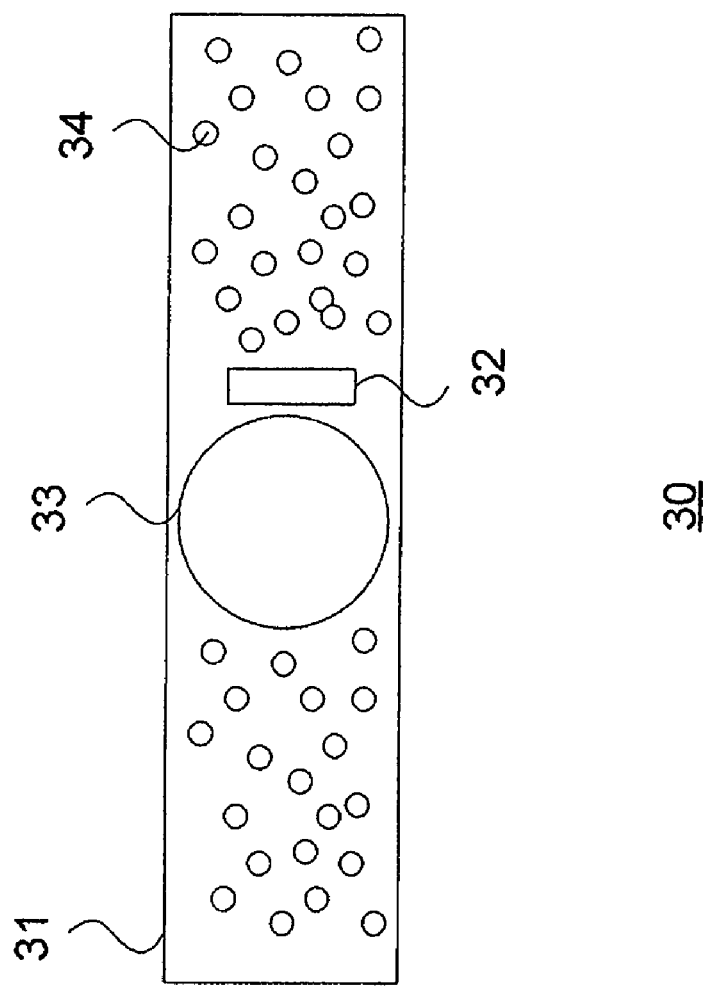
FIG. 4 illustrates a screen generation device of the image projection system according to the embodiment.

Referring to FIG. 4 the pyrotechnic shells 30 may include a cardboard tube 31, flash powder 33, the screen material 34, and the electronic match 32. The screen material may be contained within the cardboard shell tube together with the flash powder (pyrotechnic charge) and electronic match. The screen material 34 may be dispersed by causing the electronic match 32 to ignite the shell 30 after the programmable time delay from launch.

The screen material that is to be dispersed includes, for example, glass micro-spheres, salt particles or any other translucent or transparent particles. The screen material particles (particles) are of such size, shape, and density that the particles stay suspended in the air when the particles are dispersed from the screen generation device long enough to communicate an image onto the screen.

Figure 3:
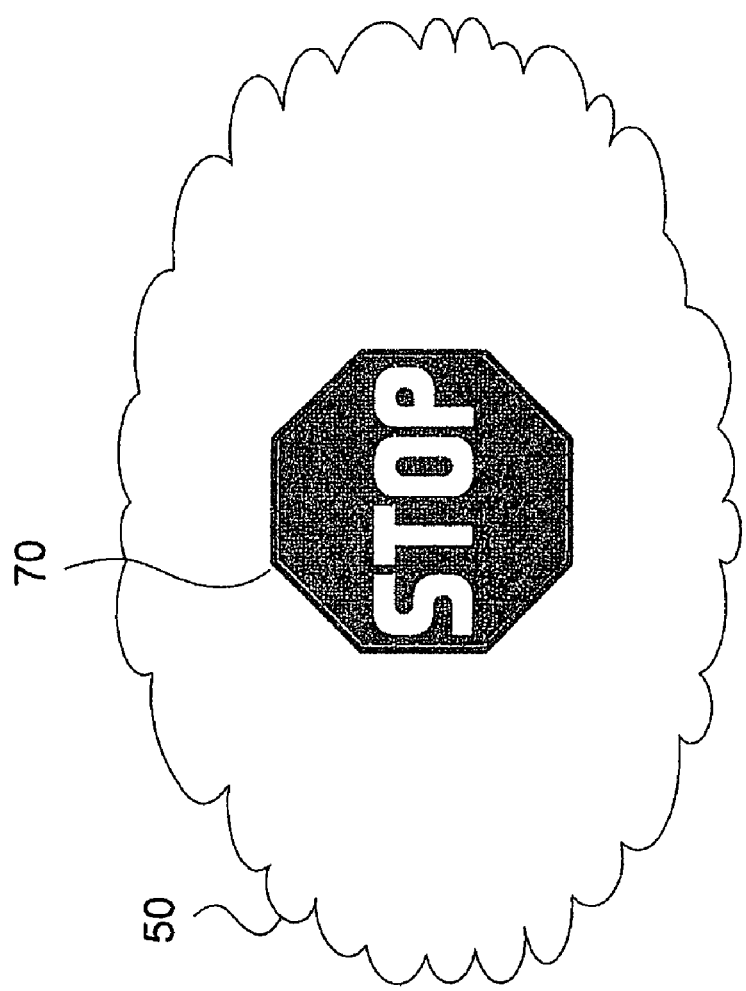
FIG. 3 illustrates an image on the projection screen as seen by an observer according to the embodiment.

Referring now to FIG. 3, as seen from the position of the observer 90 viewing the screen 50, respectively, a screen 50 is formed by dispersing the screen material particles housed within the shell 30 and an image 70 is formed on the screen 50. A pyrotechnic charge (discussed later) is used to disperse the material in a targeted volume to form the screen 50.

After the screen 50 is formed, the image 70 from a light projecting device 60, such as a projector, is aimed onto a rear side (a sender side) of the projection screen 50 with respect to an observation position of a viewer. The light is projected onto the screen 50 from a projection location of the light projecting device 60 and forms an inverse image in the air, the inverse image being a mirror image of an intended image which is intended to be displayed to a viewer, for example, at an observation position. The screen 50 formed by the screen material particles is positioned between the light projecting device 60 and the observer 90 such that the observer 90 is able to see the intended image in a rear projection configuration. However, the invention is not limited to rear projection. The light projecting device 60 may project light onto a front side of the screen 50 with respect to the observation position.

The light projecting device 60 may include an incoherent or coherent light source emitting incoherent or coherent light. In the case of use of an incoherent light source, the light source may be aimed upwards to facilitate cooling. The system may further include a mirror in this case to redirect the image onto the screen 50. The mirror may also be used to compensate for vibration of the projector, which may cause the position of the image to vary on the screen 50. In the case of use of a coherent light source, the light may be narrowly focused to limit the loss of intensity due to spreading. The system may further include a mirror in this case to control the position of the beam, allowing the image to be created by sweeping the beam back and forth in a pattern to create the desired image.

The light projecting device 60 may be a source that emits wavelengths other than visible light. The projector and screen may be used where the projection light is other than visible light (i.e., UV). Ultraviolet light is attenuated less than visible light when transmitted through fog, and thus may be used to reach a screen comprised of material that fluoresces in the visible portion of the spectrum near the intended observer, which extends the range of utility of the embodiment in dense fog conditions. When using non-visible wavelengths for projection, the screen material particles used may be opaque to visible wavelengths.

The light projecting device 60 may pass light through a filter, for example, a gobo, a sheet or a plate, that contains the image to be displayed thereon such that the intended image is presented. The gobo may comprise a painted glass plate that allows light to pass through the plate, the light being of any color or shape, such that an arbitrary image is allowed to be presented. Dynamic image filters, such as light valves or liquid crystals, may be used, thereby permitting animated images to be displayed. Similarly, a mechanical system can rapidly shutter and switch the presented image plates, also resulting in an animation. Incoherent light may be preferably used in order to avoid eye-safety issues.

In practice, the size of the screen that can be generated by a single screen generator 30 is limited by the momentum that can be imparted on the screen material particles. To produce a larger screen, a plurality of screen generation units may be housed in a single pyrotechnic shell with a primary charge to disperse the individual screen generation units.

Figure 5:
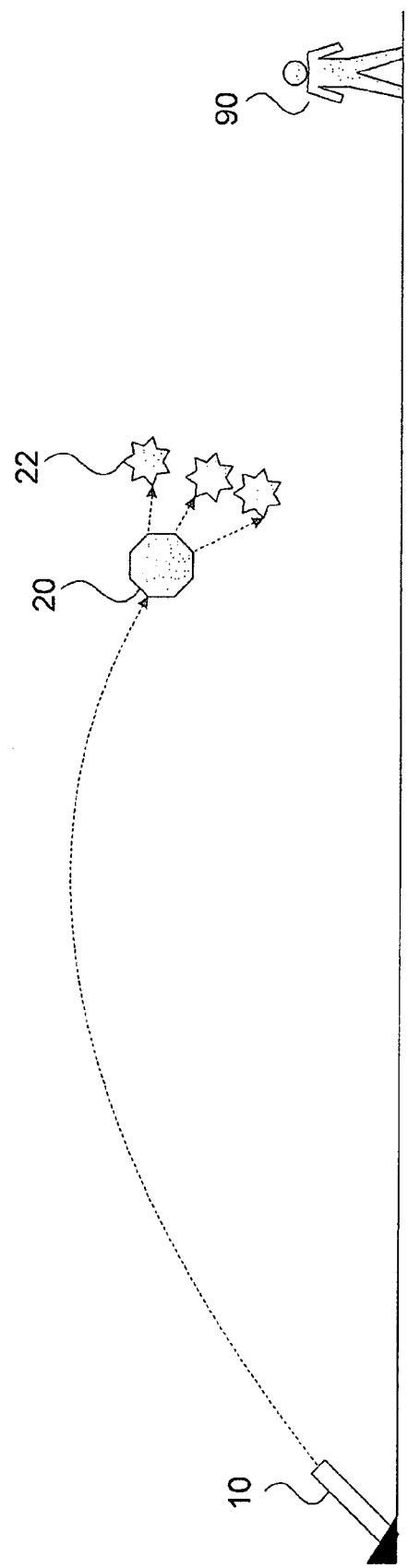
FIG. 5 illustrates a side view of a delivery device transmitting a screen generation device including a plurality of screen generation units to a targeted location according to an embodiment of the image projection system.
Figure 6:
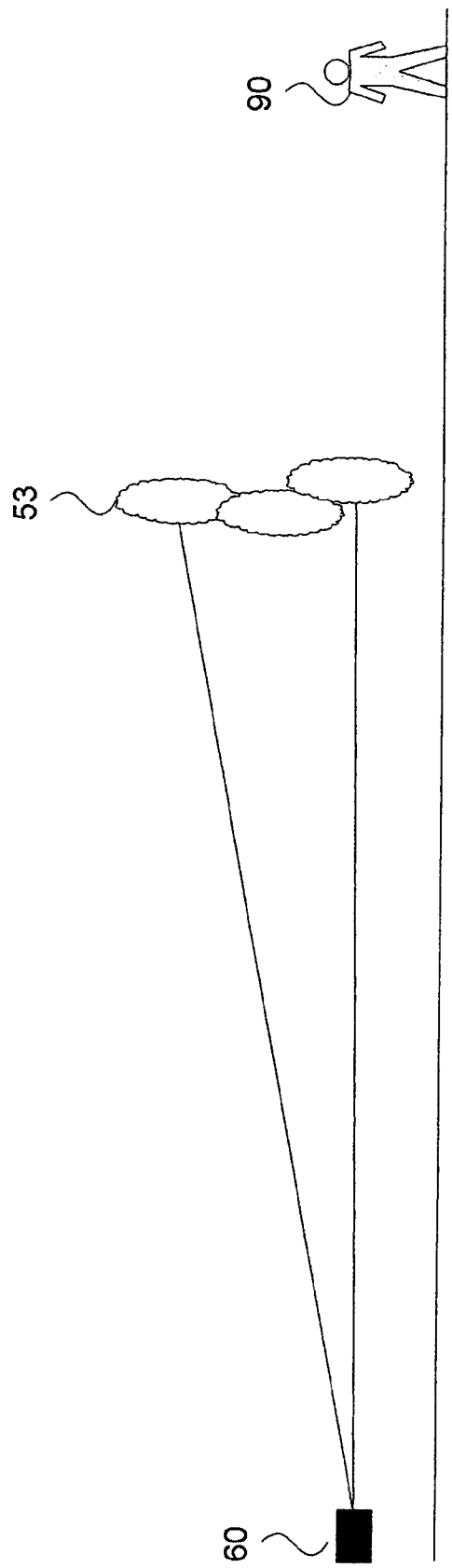
FIG. 6 illustrates a side view of a plurality of dispersed projection screens and a light projecting device of the image projection system according to the embodiment.

Referring to FIGS. 5 and 6, as seen from a side view, a delivery device 10 is used to transmit a plurality of screen generation units 22 illustrated in FIG. 5 housed in a single pyrotechnic shell 20, to a targeted screen location. When the shell 20 reaches a programmed point in the parabolic flight path, the shell 20 is caused to disperse the individual screen generation units 22. The individual screen generation units 22 are caused to disperse the screen material illustrated in FIG. 6 as the partial projection screens 53 on a fixed timed delay. A light projector 60 illustrated in FIG. 6 aims light onto the total screen 55 formed by the plurality of individual screens 53 (seen more clearly in FIG. 7).

Figure 7:
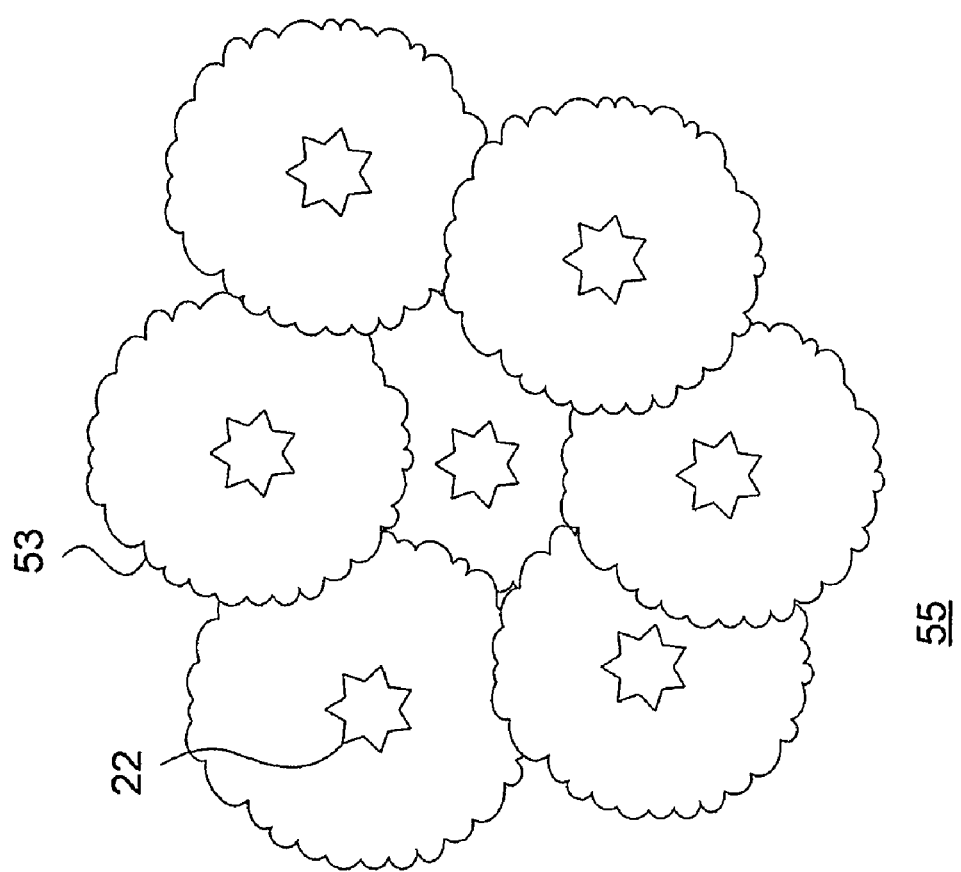
FIG. 7 illustrates individual screens of the projection screen generated by the screen generation device of the image projection system according to the embodiment.
Figure 8:
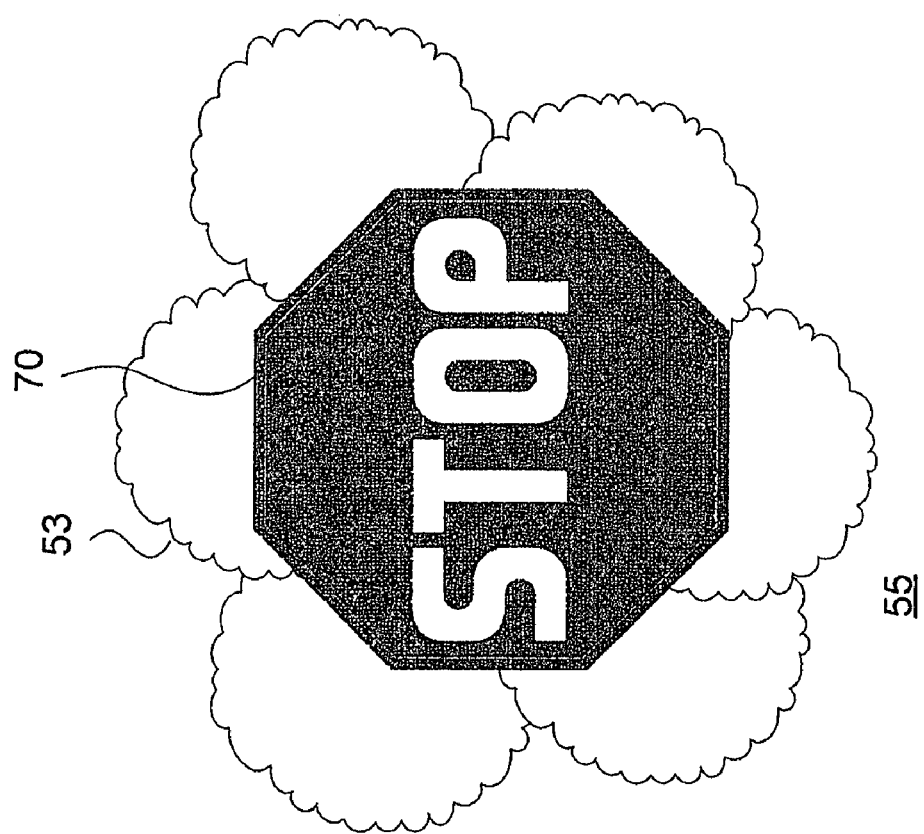
FIG. 8 illustrates an image on the individual screens of the projection screen as seen by an observer according to the embodiment.

Referring now to FIGS. 7 and 8, as seen from observer, the individual screen generation units 22 disperse the screen material to form partial screens 53 that comprise the total screen 55 as illustrated in FIG. 7. The image 70 is projected onto the total screen 55 as illustrated in FIG. 8.

Figure 9:
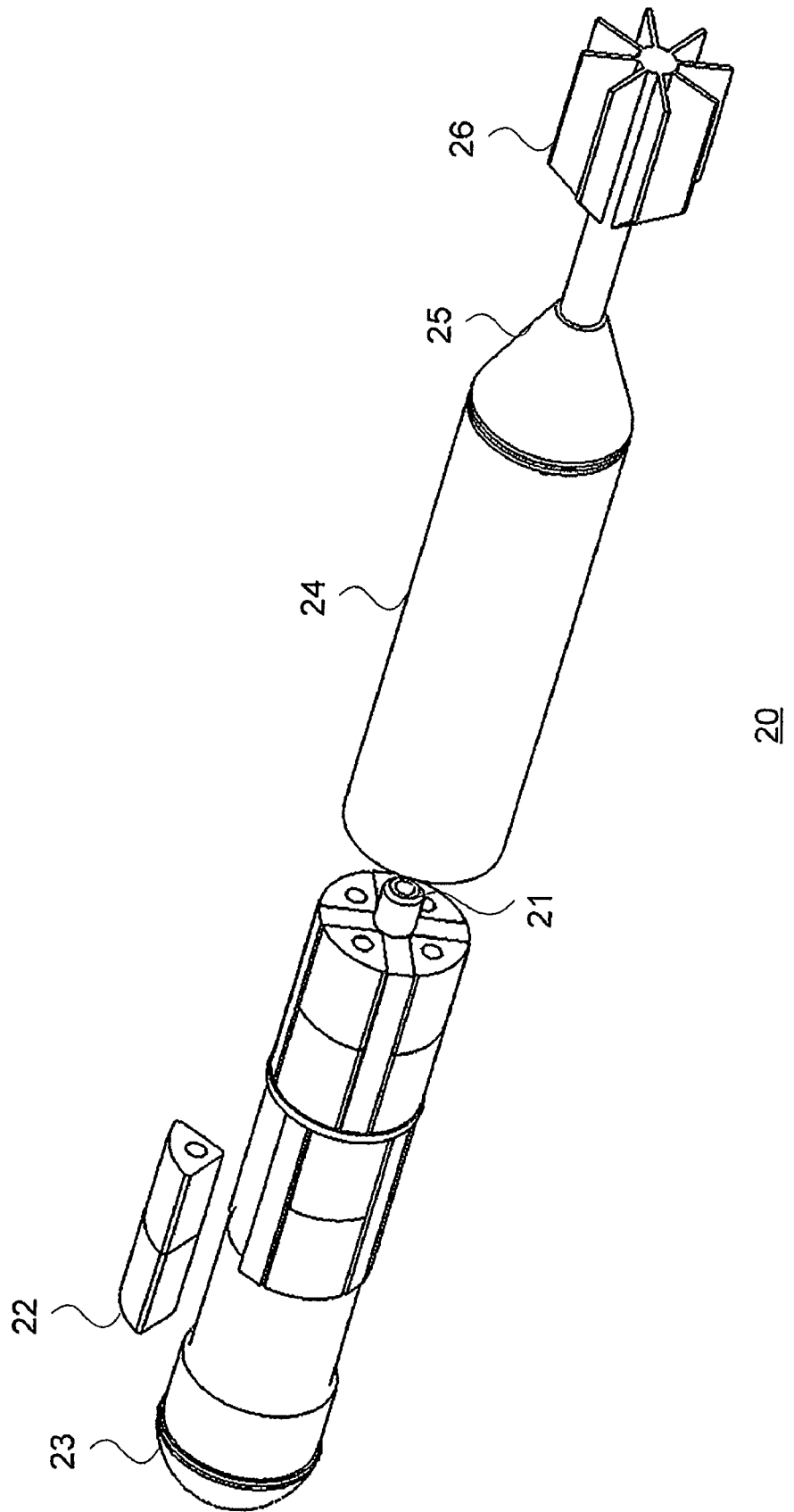
FIG. 9 illustrates a screen generation device including a plurality of screen generation units in a single shell.

Referring to FIG. 9, the pyrotechnic shell 20 may include a plurality of screen generation units 22 and a primary charge 21 to disperse the screen generation units 22. The complete shell also includes a nose section 23 and a tail section 25 with stabilizing fins 26 connected to the body section 24. A plurality of independent screen generation units 22 and a primary charge 21 are packed into the body section 24. When each of the screen generation units 22 is dispersed by the primary charge 21, the screen generation units 22 are able to generate a portion (seen more clearly in FIG. 7) of the total screen 53, thus cumulatively forming the entire screen 55. The screen generation device (including shell 20) may include a series of pyrotechnic charges to disperse the screen material particles into a larger area. In this case, one or more primary charges 21 may be used to disperse the independent screen generation units 22 near a targeted screen location, and the independent screen generation units 22 may each independently disperse the screen material particles, thus producing a portion of the total screen.

As seen in FIG. 7, from an observation position of a viewer, each of the charges 22 detonates, which results in small screen 53, which form the total screen 55.

The screen generation device may include flash-bang charges for either the primary charge 21 dispersing the screen generation units 22 or the dispersion charge within each screen generation unit 22. Flash-bang charges create a flash of light and loud noise to attract attention to the screen 55. Alternatively, the screen generation device may include a non-explosive mechanism to disperse the screen material particles using rotational forces and/or airflow.

Those having ordinary skill in the art will readily appreciate that technologies that spawn from warning system projects will have application outside of these projects. For example, image projection systems onto a targeted and free-floating screen may be used for entertainment purposes as part of a fireworks display, advertisement system, etc.

Although a few embodiments have been shown and described, it would be appreciated by those skilled in the art that changes might be made in these embodiments without departing from the principles and spirit of the invention, the scope of which is defined in the claims and their equivalents.

What is claimed is:

1. An image projection system to communicate an image into the air, comprising:
 a plurality of solid, non-aqueous screen material particles;
 a screen generation device to disperse the screen material particles from the screen generation device at a targeted screen location, thereby forming a projection screen;
 a delivery device to launch the screen generation device from a launch location to the targeted screen location in the air; and
 a light projecting device to project light from a projection location onto the screen to form the image on the screen so as to be visible from an observation location of a viewer.

2. The image projection system according to claim 1, wherein the delivery device is a launcher.

3. The image projection system according to claim 1, wherein the particles are translucent particles.

4. The image projection system according to claim 1, wherein the particles are transparent particles.

5. The image projection system according to claim 1, wherein the particles are salt particles.

6. The image projection system according to claim 1, wherein the particles are glass micro spheres.

7. The image projection system according to claim 1, wherein the particles fluoresce when illuminated by non-visible wavelengths of light.

8. The image projection system according to claim 1, wherein the screen generation device is comprised of a pyrotechnic charge to disperse the screen material particles.

9. The image projection system according to claim 1, wherein the screen generation device is comprised of a primary charge and a plurality of independent screen generation units, the primary charge dispersing the screen generation units, the screen generation units independently dispersing the screen material particles.

10. The image projection system according to claim 1, wherein the screen generation device is comprised of a mechanism to disperse the particles using rotational forces and airflow.

11. The image projection system according to claim 1, wherein the light projecting device projects light onto a rear side of the screen with respect to the observation location.

12. The image projection system according to claim 1, wherein the light projecting device projects light onto a front side of the screen with respect to the observation location.

13. The image projection system according to claim 1, wherein the light projecting device is comprised of an incoherent light source.

14. The image projection system according to claim 1, wherein the light projecting device is comprised of a coherent light source.

15. The image projection system according to claim 1, wherein the light projecting device is comprised of a source that emits wavelengths other than visible light.

16. The image projection system according to claim 1, wherein the light projecting device forms the image by shining light through a sheet or plate that contains the image thereon.

17. The image projection system according to claim 1, wherein the light projecting device forms the image by scanning a light beam to draw the image.

18. The image projection system according to claim 1, wherein the screen material particles have a size weight and shape to form a colloidal suspension after the screen material particles are dispersed.

19. An image projection system to communicate an image into the air, comprising:

a delivery device transmitting a plurality of non-aqueous particles in a target volume above a surface into the air;

a dispersion device causing the target volume of the non-aqueous particles to be dispersed within a targeted region in the air to form a screen; and a light projecting device projecting light onto the screen to form the image visible from a targeted viewing position of the image.

20. A method of forming an image projection system for communicating an image into the air, comprising:

transmitting a plurality of non-aqueous particles in a target volume above a surface into the air;

causing the target volume of the non-aqueous particles to be dispersed within a targeted region in the air to form a screen; and projecting light onto the screen to form the image visible from a targeted viewing position of the image.

* * * * *

UNITED STATES PATENT AND TRADEMARK OFFICE
CERTIFICATE OF CORRECTION

| | | |
|---|---|---|
| PATENT NO. | : 7,710,643 B2 | Page 1 of 1 |
| APPLICATION NO. | : 11/902936 | |
| DATED | : May 4, 2010 | |
| INVENTOR(S) | : Michael Mitchell-Dignan et al. | |

It is certified that error appears in the above-identified patent and that said Letters Patent is hereby corrected as shown below:

On the Title Page, Column 2 (Other Publications), Line 2, Change "Unambiuous" to --Unambiguous--

On the Title Page, Column 2 (Other Publications), Line 4, Change "ichael" to --Michael--

Signed and Sealed this

Third Day of August, 2010

David J. Kappos
*Director of the United States Patent and Trademark Office*